United States Patent
Ham et al.

(10) Patent No.: US 11,984,267 B2
(45) Date of Patent: *May 14, 2024

(54) DIELECTRIC COMPOSITION AND MULTILAYERED ELECTRONIC COMPONENT COMPRISING THE SAME

(71) Applicant: SAMSUNG ELECTRO-MECHANICS CO., LTD., Suwon-si (KR)

(72) Inventors: Tae Young Ham, Suwon-si (KR); Ji Hong Jo, Suwon-si (KR); Seung In Baik, Suwon-si (KR); Hyung Soon Kwon, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,469

(22) Filed: Nov. 22, 2022

(65) Prior Publication Data

US 2023/0082113 A1 Mar. 16, 2023

Related U.S. Application Data

(63) Continuation of application No. 16/836,324, filed on Mar. 31, 2020, now Pat. No. 11,538,631.

(30) Foreign Application Priority Data

Jun. 28, 2019 (KR) .................. 10-2019-0077574

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *H01G 4/012* (2013.01);
(Continued)

(58) Field of Classification Search
CPC ........ C04B 35/4682; C04B 2235/3206; C04B 2235/3224; C04B 2235/3236;
(Continued)

(56) References Cited

U.S. PATENT DOCUMENTS 9,666,371 B2  5/2017  Morita et al.
11,127,532 B2  9/2021  Choi et al.
(Continued)

FOREIGN PATENT DOCUMENTS

CN  1988084 A  6/2007
CN  101027264 A  8/2007
(Continued)

OTHER PUBLICATIONS

Office Action issued in corresponding Korean Patent Application No. 10-2019-0077574 dated Apr. 24, 2020, with English translation.
(Continued)

*Primary Examiner* — Nathan Milakovich
(74) *Attorney, Agent, or Firm* — MORGAN, LEWIS & BOCKIUS LLP

(57) ABSTRACT

A dielectric composition includes a main ingredient having a perovskite structure represented by $ABO_3$, where A is at least one of Ba, Sr, and Ca and B is at least one of Ti, Zr, and Hf, and a first accessory ingredient. The first accessory ingredient comprises 0.1 mole or more of a rare earth element, 0.02 mole or more of Nb, and 0.25 mole or more and 0.9 mole or less of Mg, a sum of contents of the rare earth element and Nb is 1.5 mole or less.

12 Claims, 4 Drawing Sheets

(51) Int. Cl.
  *H01G 4/012* (2006.01)
  *H01G 4/248* (2006.01)
  *H01G 4/30* (2006.01)

(52) U.S. Cl.
  CPC ............ *H01G 4/248* (2013.01); *H01G 4/30* (2013.01); *C04B 2235/3206* (2013.01); *C04B 2235/3224* (2013.01); *C04B 2235/3236* (2013.01); *C04B 2235/3251* (2013.01); *C04B 2235/768* (2013.01); *C04B 2235/785* (2013.01)

(58) Field of Classification Search
  CPC ...... C04B 2235/3251; C04B 2235/768; C04B 2235/785; H01G 4/012; H01G 4/1227; H01G 4/30
  See application file for complete search history.

(56) References Cited

U.S. PATENT DOCUMENTS

| | | | |
|---|---|---|---|
| 11,222,749 | B2 | 1/2022 | Kim et al. |
| 11,538,631 | B2 * | 12/2022 | Ham ................ H01G 4/30 |
| 2007/0138128 | A1 | 6/2007 | Katoh et al. |
| 2009/0086407 | A1 * | 4/2009 | Takahashi ............ C04B 35/638 |
| | | | 361/321.5 |
| 2010/0029464 | A1 | 2/2010 | Shibasaki et al. |
| 2011/0157769 | A1 | 6/2011 | Kang et al. |
| 2011/0195178 | A1 | 8/2011 | Kojima et al. |
| 2013/0162100 | A1 | 6/2013 | Kang et al. |
| 2016/0111213 | A1 | 4/2016 | Okamoto |
| 2016/0217924 | A1 | 7/2016 | Morita et al. |
| 2020/0395172 | A1 | 12/2020 | Choi et al. |
| 2020/0395175 | A1 | 12/2020 | Kim et al. |
| 2021/0343477 | A1 | 11/2021 | Choi et al. |
| 2022/0093335 | A1 | 3/2022 | Kim et al. |

FOREIGN PATENT DOCUMENTS

| | | |
|---|---|---|
| CN | 101638318 A | 2/2010 |
| CN | 102190493 A | 9/2011 |
| CN | 105826074 A | 8/2016 |
| JP | H10-330160 A | 12/1998 |
| JP | 2009-203089 A | 9/2009 |
| JP | 2011-162397 A | 8/2011 |
| JP | 2014-210685 A | 11/2014 |
| KR | 10-2005-0084713 A | 8/2005 |
| KR | 10-2016-0030547 A | 3/2016 |
| KR | 10-2016-0092906 A | 8/2016 |
| KR | 10-2019-0116109 A | 10/2019 |
| KR | 10-2019-0116111 A | 10/2019 |

OTHER PUBLICATIONS

Office Action issued in corresponding Chinese Patent Application No. 202010541176.3 dated Aug. 4, 2021, with English translation.
Notice of Allowance issued in corresponding U.S. Appl. No. 16/836,324 dated Sep. 16, 2022.
Final Office Action issued in corresponding U.S. Appl. No. 16/836,324 dated Jun. 20, 2022.
Office Action issued in corresponding U.S. Appl. No. 16/836,324 dated Mar. 2, 2022.
Office Action issued in corresponding Japanese Patent Application No. 2020-107353 on Dec. 26, 2023, with English abstract.

* cited by examiner

DIELECTRIC COMPOSITION AND MULTILAYERED ELECTRONIC COMPONENT COMPRISING THE SAME

CROSS-REFERENCE TO RELATED APPLICATION(S)

This application is a continuation application of U.S. patent application Ser. No. 16/836,324 filed on Mar. 31, 2020, which claims benefit of priority to Korean Patent Application No. 10-2019-0077574 filed on Jun. 28, 2019, in the Korean Intellectual Property Office, the disclosures of which are incorporated herein by reference in their entirety.

BACKGROUND

1. Technical Field

The present disclosure relates to a dielectric composition and a multilayer electronic component comprising the same.

2. Description of Related Art

A multilayer ceramic capacitor (MLCC), a type of multilayer electronic component, is a chip type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

The multilayer ceramic capacitor may be used as a component of various electronic devices due to advantages thereof, such as miniaturization, high capacity, and ease of mounting. As electronic devices such as computers and mobile devices are miniaturized and implemented with high output, demand for miniaturization and implementation of high capacity of a multilayer ceramic capacitor are increasing.

In order to achieve miniaturization and high capacity of a multilayer ceramic capacitor, thicknesses of dielectric layers and internal electrodes may need to be reduced such that the number of stacked layers thereof may be increased. Generally, a thickness of a dielectric layer is around 0.6 μm, and thinning is continuously undertaken.

However, as the thickness of the dielectric layer is reduced, reliability may be lowered and characteristics such as insulation resistance, a breakdown voltage and the like, may be lowered.

To address the above-described problems, it has been necessary to secure high reliability not only in terms of a structural aspect but also in a compositional aspect of a dielectric.

If a dielectric composition, which may improve reliability at a current level one step further, is secured, a size of a multilayer ceramic capacitor may be reduced further than before.

SUMMARY

An aspect of the present disclosure is to provide a dielectric composition having excellent reliability and a multilayer electronic component including the dielectric composition.

Another aspect of the present disclosure is to provide a dielectric composition having excellent insulation resistance and a multilayer electronic component including the dielectric composition.

Another aspect of the present disclosure is to provide a dielectric composition having a high breakdown voltage and a multilayer electronic component including the dielectric composition.

Another aspect of the present disclosure is to achieve miniaturization and high capacity of the multilayer electronic component.

According to an aspect of the present disclosure, a dielectric composition includes a main ingredient having a perovskite structure represented by $ABO_3$, where A is at least one selected from the group consisting of barium (Ba), strontium (Sr), and calcium (Ca), and B is at least one selected from the group consisting of titanium (Ti), zirconium (Zr), and hafnium (Hf), and a first accessory ingredient, wherein the first accessory ingredient includes 0.1 mole or more of a rare earth element, 0.02 mole or more of niobium (Nb), and 0.25 mole or more and 0.9 mole or less of magnesium (Mg), wherein a sum of contents of the rare earth element and Nb is 1.5 mole or less, based on 100 mole of the main ingredient.

According to another aspect of the present disclosure, a multilayer electronic component includes a body including a dielectric layer and an internal electrode; and an external electrode disposed in the body and connected to the internal electrode, wherein the dielectric layer includes a dielectric composition, wherein the dielectric composition includes a main ingredient having a perovskite structure represented by $ABO_3$, where A is at least one of Ba, Sr, and Ca, and B is at least one of Ti, Zr, and Hf, and a first accessory ingredient, wherein the first accessory ingredient includes 0.1 mole or more of a rare earth element, 0.02 mole or more of Nb, and 0.25 mole or more and 0.9 mole or less of Mg, wherein a sum of contents of the rare earth element and Nb is 1.5 mole or less, based on 100 mole of the main ingredient.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
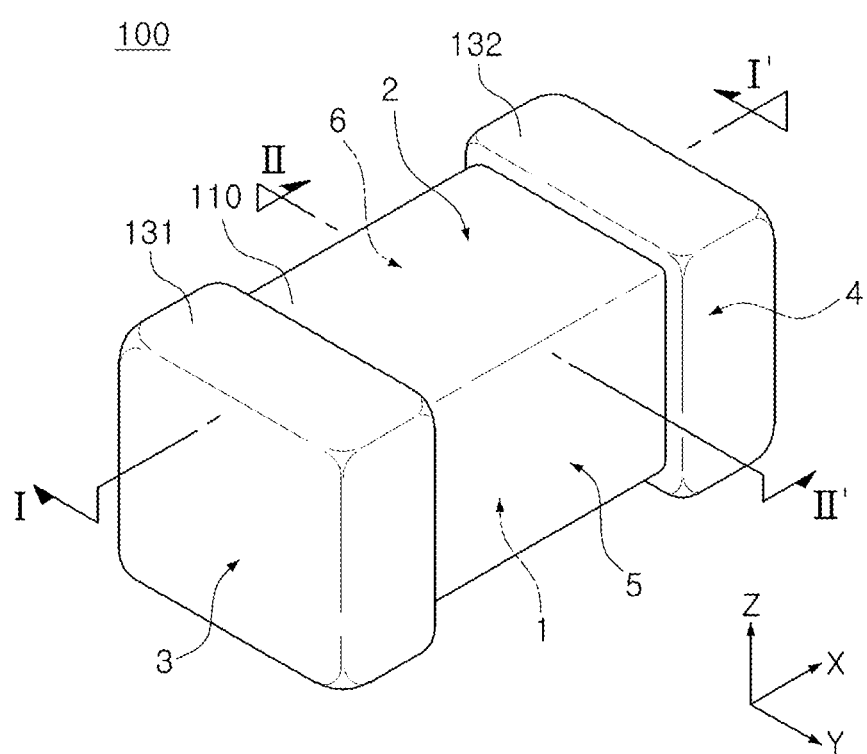
FIG. 1 schematically illustrates a perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. In the drawings, the shapes and dimensions of elements may be exaggerated for clarity. Further, in the drawings, elements having the same functions within the same scope of the inventive concept will be designated by the same reference numerals.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, an X direction may be defined as a second direction and an L direction or a thickness direction, and a Z direction may be defined as a first direction, a stacking direction and a T direction or a thickness direction.

Dielectric Composition

A dielectric composition according to an embodiment of the present disclosure includes a main ingredient having a perovskite structure represented by $ABO_3$, where A is at least one of Ba, Sr, and Ca, and B is at least one of Ti, Zr, and Hf, and a first accessory ingredient, wherein the first accessory ingredient includes 0.1 mole or more of a rare earth element, 0.02 mole or more of Nb, and 0.25 mole or more and 0.9 mole or less of Mg, and a sum of contents of the rare earth element and a Nb content is 1.5 mole or less, based on 100 mole of the main ingredient (based on 100 mole of Ti of the main ingredient).

In the case of the main ingredient having a perovskite structure represented by $ABO_3$, an oxygen vacancy may occur in which vacancies for oxygen are vacated. For example, when sintering is carried out in a reducible atmosphere, an oxygen vacancy may occur, and an oxygen vacancy may occur when carbon is combined with oxygen of $ABO_3$ to evaporate in a $CO_2$ form by a debinder or the like.

That is, 0 has a charge of −2 valence. If a place in which oxygen should be present is empty, an oxygen vacancy having a charge of +2 valence occurs, if an oxygen vacancy moves by an applied electric field, reliability becomes poor, and the greater the oxygen vacancy and the higher the temperature and the voltage, the greater the moving speed and the moving amount are increased, thereby further deteriorating reliability.

In order to address a problem of an oxygen vacancy, it is known to improve reliability by reducing concentration of an oxygen vacancy by adding a rare earth element in general.

However, in the $ABO_3$ structure, an amount of an additive that can be dissolved in the A-site is limited, and it is difficult to effectively reduce concentration of an oxygen vacancy only by adding the rare earth element, or insulation resistance may be decreased due to excessive semiconductorization.

Accordingly, in the present disclosure, an appropriate amount of rare earth elements, Nb, and Mg are added as a first accessory ingredient to a dielectric composition including a main ingredient having a perovskite structure represented by $ABO_3$, where A is at least one of Ba, Sr, and Ca and B is at least one of Ti, Zr, and Hf, to improve reliability.

Hereinafter, each component of the dielectric composition according to an embodiment of the present disclosure will be described in detail.

a) Main Ingredient

A dielectric composition according to an embodiment of the present disclosure includes a main ingredient having a perovskite structure represented by $ABO_3$, where A is at least one of Ba, Sr, and Ca, and B is at least one of Ti, Zr, and Hf.

More specifically, for example, the main ingredient having the perovskite structure represented by $ABO_3$ may be one or more selected from a group consisting of $BaTiO_3$, $SrTiO_3$, $(Ba_{1-x}Ca_x)(Ti_{1-y}Ca_y)O_3$ (where, x satisfies 0≤x≤0.3, y satisfies 0≤y≤0.1), $(Ba_{1-x}Ca_x)(Ti_{1-y}Zr_y)O_3$ (where, x satisfies 0≤x≤0.3, y satisfies 0≤y≤0.5), and $Ba(Ti_{1-y}Zr_y)O_3$ (where, y satisfies 0<y≤0.5).

The dielectric composition according to an embodiment of the present disclosure may have a room temperature dielectric constant of 2000 or more.

The main ingredient is not particularly limited, but an average particle size of a main ingredient powder may be 40 nm or more and 200 nm or less.

b) First Accessory Ingredient

According to an embodiment of the present disclosure, the dielectric composition includes 0.1 mole or more of a rare earth element, 0.02 mole or more of Nb, and 0.25 mole or more and 0.9 mole or less of Mg, based on 100 mole of the main ingredient, and a sum of contents of the rare earth element and Nb is 0.5 mole or less, based on 100 mole of the main ingredient.

The rare earth element acts as a donor by substituting an A-site having the $ABO_3$ structure, thereby improving reliability by reducing concentration of oxygen vacancies. In addition, the rare earth element act as a barrier for blocking a flow of electrons in a grain boundary, thereby suppressing an increase in a leakage current. When the content of the rare earth element is less than 0.1 mole, based on 100 mole of the main ingredient, the above-described effect may be insufficient.

Generally, in the $ABO_3$ structure, since an amount of the additive that can be dissolved in the A-site is limited, it is difficult to effectively reduce concentration of an oxygen vacancy only by adding the rare earth element, or insulation resistance may be lowered due to excessive semiconductorization.

Since an amount of the additive that can be dissolved in a B-site is higher than an amount of the additive that can be dissolved in the A-site in the $ABO_3$ structure, in the present disclosure, the B-site having the $ABO_3$ structure is substituted together with the rare earth element, and Nb serving as a donor is added to improve reliability. When the Nb content is less than 0.02 mole, based on 100 mole of the main ingredient, the above-described effect may be insufficient.

In addition, Nb is not only disposed in a dielectric crystal grain but also in a grain boundary, such that the insulation resistance of the multilayer ceramic capacitor may be prevented from being lowered and reliability may be improved.

As the sum of the rare earth element and the Nb content in the dielectric composition increases, it is advantageous from a viewpoint of improving reliability, but since the rare earth element may be semiconductorized at a certain amount or more, and characteristics of insulators are lowered and sintering properties are reduced, it is preferable that the sum of contents of the rare earth element and Nb is 1.5 mole or less, based on 100 mole of the main ingredient.

Mg may serve as an acceptor by substituting a B-site having an $ABO_3$ structure and serve to reduce concentration of electrons.

Mg competes with Nb for substituting the B-site having the $ABO_3$ structure, such that it is necessary to appropriately adjust the content thereof.

When the Mg content is 0.25 mole or more and 0.9 mole or less, based on 100 mole of the main ingredient, a reliability improvement effect due to n-typeization may be maximized, and when the Mg content exceeds 0.9 mole, a breakdown voltage BDV may be lowered, which is not preferable. A more preferable range of the Mg content may be 0.25 mole or more and 0.7 mole or less, based on 100 mole of the main ingredient.

Meanwhile, the rare earth element is not particularly limited and may be one or more, for example, scandium (Sc), yttrium (Y), lanthanum (La), actinium (Ac), cerium (Ce), praseodymium (Pr), neodymium (Sm), europium (Eu), gadolinium (Gd), terbium (Tb), dysprosium (Dy), holmium (Ho), erbium (Er), thulium (Tm), ytterbium (Yb), and ruthenium (Lu).

However, when a rare earth element having a larger ionic radius than Dy, such as lanthanum (La), samarium (Sm), or the like, is used, it is more effective to reduce the oxygen vacancy defect concentration since the Ba-site may be substituted more efficiently, but the insulation resistance may drop sharply due to excessive semiconductorization. Therefore, it is more preferable that the rare earth element is Dy or an element having a smaller ionic radius than that of Dy. The rare earth element having the smaller ionic radius than Dy may be for example, Ho, Y, Er, Yb, and the like.

In addition, in consideration of both reducing an oxygen vacancy defect concentration and ensuring insulation resistance, it is more preferable that $BaTiO_3$ is a main ingredient having a perovskite structure represented by the $ABO_3$ and Dy is the rare earth element.

c) Second Accessory Ingredient

According to an embodiment of the present disclosure, the dielectric composition may include oxides or carbonates including at least one among manganese (Mn), vanadium (V), chromium (Cr), iron (Fe), nickel (Ni), cobalt (Co), copper (Cu) and zinc (Zn) as a second accessory ingredient.

The oxides or carbonates including at least one among Mn, V, Cr, Fe, Ni, Co, Cu and Zn as the second accessory ingredient may be included in the dielectric composition in an amount of 0.1 to 2.0 mole, based on 100 mole of the main ingredient.

The second accessory ingredient serves to lower a sintering temperature and improve high-temperature withstand voltage characteristics of the multilayer ceramic capacitor to which the dielectric composition is applied.

The content of the second accessory ingredient and the content of the third accessory ingredient in the dielectric composition, to be described later, may be based on 100 mole of the main ingredient, and in particular, may be defined as a mole of a metal ion included in each of the accessory ingredients.

If the content of the second accessory ingredient in the dielectric composition is less than 0.1 mole based on 100 mole of the main ingredient, a sintering temperature may be increased and a high-temperature withstand voltage characteristic may be somewhat lowered.

If the content of the second accessory ingredient is 2.0 mole or more based on 100 mole of the main ingredient, a high-temperature withstand voltage characteristic and room temperature resistivity may be somewhat lowered.

In particular, the dielectric composition according to an embodiment of the present disclosure may include a second accessory ingredient having a content of 0.1 to 2.0 mole, based on 100 mole of the main ingredient, whereby low-temperature sintering is possible and the high-temperature withstand characteristic may be obtained.

d) Third Accessory Ingredient

According to an embodiment of the present disclosure, the dielectric composition may include an oxide including at least one of silicon (Si) or aluminum (Al) or a glass compound including Si as a third accessory ingredient.

The dielectric composition may further include 0.001 to 0.5 mole of a third accessory ingredient, which is an oxide including at least one of Si or Al or a glass compound including Si, based on 100 mole of the main ingredient.

A content of the third accessory ingredient in the dielectric composition may be based on a content of at least one of Si or Al included in the third accessory ingredient without distinguishing a form of addition such as glass, oxides, or carbonates.

The third accessory ingredient serves to reduce a sintering temperature and improve the high-temperature voltage characteristics of the multilayer ceramic capacitor to which the dielectric composition is applied.

If the content of the third accessory ingredient in the dielectric composition exceeds 0.5 mole, based on 100 mole of the main ingredient, problems of degradation of sintering properties and density, creation of a secondary phase, and the like may occur, which is not preferable.

In particular, according to an embodiment of the present disclosure, the dielectric composition includes aluminum (Al) in an amount of 0.5 mole or less based on 100 mole of the main ingredient, such that Al acts as an acceptor, thereby rather reducing electron concentration and it is effective to improve reliability.

Multilayer Electronic Component

FIG. 1 schematically illustrates a perspective view of a multilayer electronic component according to an embodiment of the present disclosure.

Figure 2:
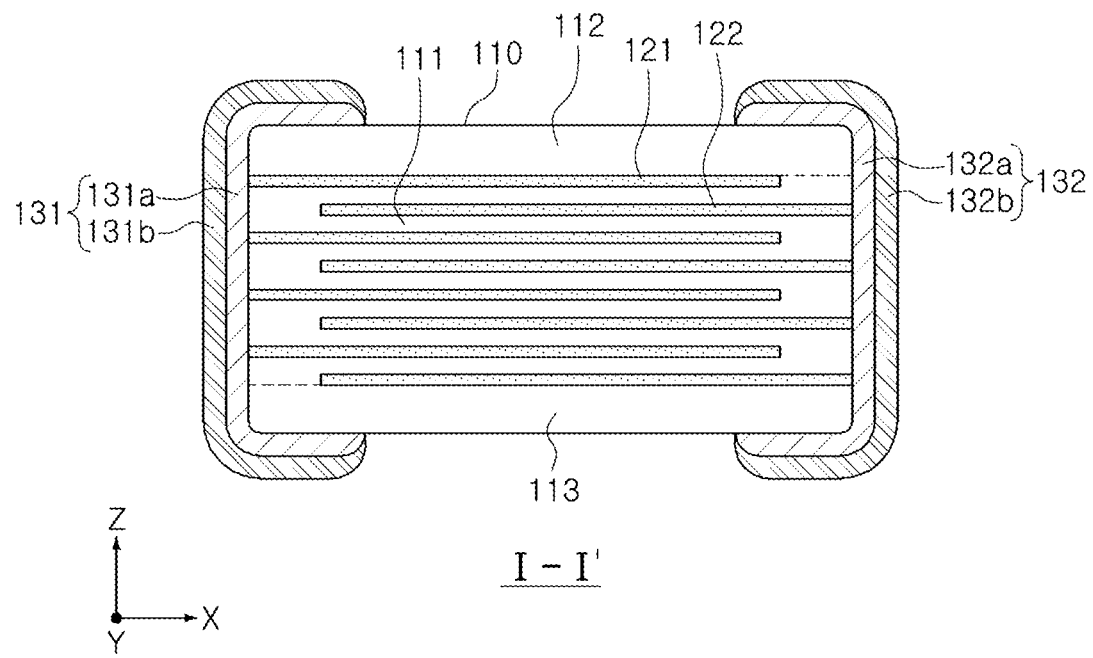
FIG. 2 schematically illustrates a cross-sectional view taken along line I-I' of FIG. 1.

FIG. 2 schematically illustrates a cross-sectional view taken along line I-I' of FIG. 1.

Figure 3:
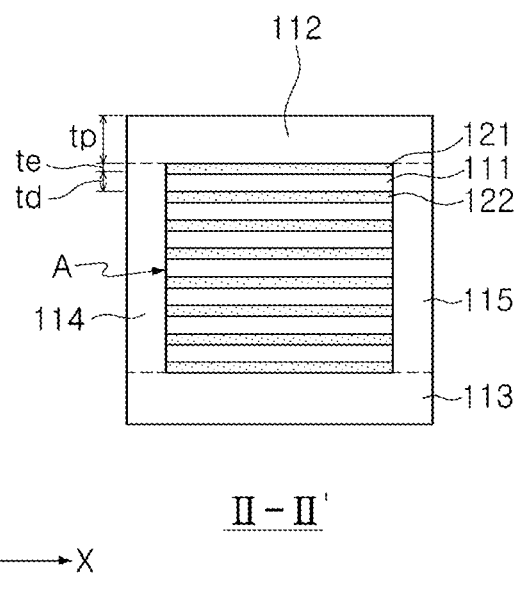
FIG. 3 schematically illustrates a cross-sectional view taken along line II-II' of FIG. 1.

FIG. 3 schematically illustrates a cross-sectional view taken along line II-II' of FIG. 1.

Referring to FIGS. 1 to 3, a multilayer electronic component according to an embodiment of the present disclosure includes a body 110 including a dielectric layer 111 and internal electrodes 121 and 122; and external electrodes 131 and 132 disposed in the body 110 and connected to the internal electrodes 121 and 122, respectively, the dielectric layer 111 includes a dielectric composition, the dielectric composition includes a main ingredient having a perovskite structure represented by $ABO_3$, where A is at least one of Ba, Sr, and Ca and B is at least one of Ti, Zr, and Hf, and a first accessory ingredient, and the first accessory ingredient includes 0.1 mole or more of a rare earth element, 0.02 mole or more of Nb, and 0.25 mole or more and 0.9 mole or less of Mg, and the sum of the contents of the rare earth element and Nb is 1.5 mole or less, based on 100 mole of the main ingredient.

Hereinafter, portions overlapping with those described in the above-described dielectric composition will be omitted in order to avoid redundant explanations. In addition, a multilayer ceramic capacitor is described as an example of a multilayer electronic component. However, the present disclosure may be applied to various electronic products using the above-described dielectric composition, such as, an inductor, a piezoelectric element, a varistor, a thermistor, or the like.

The body 110 has a dielectric layer 111 and internal electrodes 121 and 122, alternately stacked.

The specific shape of the body 110 is not particularly limited, but as illustrated, the body 110 may have a hexahedral shape, or a shape similar thereto. Due to shrinkage of a ceramic powder included in the body 110 during a sintering process, the body 110 may have a substantially hexahedral shape, but may not have a hexahedral shape having completely straight lines.

The body 110 may have first and second surfaces 1 and 2 opposing each other in a first direction (Z direction), third and fourth surfaces 3 and 4 connected to the first and second surfaces 1 and 2 and opposing each other in a second direction (X direction), and fifth and sixth surfaces 5 and 6 connected to the first and second surfaces 1 and 2 and the third and fourth surfaces 3 and 4 and opposing each other in a third direction (Y direction).

The plurality of dielectric layers 111 forming the body 110 are in a sintered state and boundaries between adjacent dielectric layers 111 may be integrated so as to be difficult to confirm without using a scanning electron microscope SEM.

The dielectric layer 111 may be formed using the dielectric composition described above.

The dielectric layer 111 may include a plurality of crystal grains and a grain boundary disposed between adjacent crystal grains.

In this case, Nb included in the dielectric composition may be included in the plurality of crystal grains and grain boundaries. Nb may be disposed not only in the crystal grains but also in the grain boundaries, such that the degradation of the insulation resistance of the multilayer ceramic capacitor may be prevented and reliability may be improved.

In addition, an average grain size of the crystal grains may be 200 nm or less. In this case, the reliability and the insulation resistance improvement effect according to the present disclosure may be more remarkable.

Meanwhile, the body 110 may include a capacitance formation portion A disposed in the body 110 and including a first internal electrode 121 and a second internal electrode 122 disposed to oppose each other with the dielectric layer 111 interposed therebetween and having capacitance formed therein and cover portions 112 and 113 formed in upper and lower portions of the capacitance formation portion A.

In addition, the capacitance formation portion A is a portion serving to contribute to capacitance formation of the capacitor, and may be formed by repeatedly laminating a plurality of first and second internal electrodes 121 and 122 with a dielectric layer 111 interposed therebetween.

The upper cover portion 112 and the lower cover portion 113 may be formed by laminating a single dielectric layer or two or more dielectric layers on the upper and lower surfaces of the capacitance formation portion A in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover position 113 may include a ceramic material, for example, a barium titanate (BaTiO$_3$)-based ceramic material.

In addition, margin portions 114 and 115 may be disposed on a side surface of the capacitance formation portion A.

The margin portions 114 and 115 may include a margin portion 114 disposed on the sixth surface 6 of the body 110 and a margin portion 115 disposed on the fifth surface 5 of the body 110. That is, the margin portions 114 and 115 may be disposed on both side surfaces of the body 110 in a width direction.

The margin portions 114 and 115 may mean regions between an interface of both ends of the first and second internal electrodes 121 and the body 110 in a cross-section of the body 110 in a width-thickness (W-T) direction, as shown in FIG. 3.

The margin portions 114 and 115 may basically serve to prevent damages to the internal electrodes due to physical or chemical stresses.

The margin portions 114 and 115 may be formed by applying a conductive paste onto the ceramic green sheet to form an internal electrode, except where margin portions are to be formed.

In addition, in order to suppress a step by the internal electrodes 121 and 122, after the internal electrodes are cut so as to be exposed to the fifth and sixth surfaces 5 and 6 of the body after lamination, the margin portions 114 and 115 may be formed by laminating a single dielectric layer or two or more dielectric layers on both side surfaces of the capacitance formation portion A in the width direction.

The internal electrodes 121 and 122 are alternately laminated.

The internal electrodes 121 and 122 may include first and second internal electrodes 121 and 122. The first and second internal electrodes 121 and 122 may be alternately disposed to oppose each other with the dielectric layer 111 constituting the body 110 interposed therebetween, and may be exposed to the third and fourth surfaces 3 and 4 of the body 110, respectively.

Referring to FIG. 2, the first internal electrode 121 may be spaced apart from the fourth surface 4 and exposed through the third surface 3, and the second internal electrode 122 may be spaced apart from the third surface 3 and exposed through the fourth surface 4.

In this case, the first and second internal electrodes 121 and 122 may be electrically separated from each other by a dielectric layer 111 disposed in the middle.

The body 110 may be formed by alternately laminating a ceramic green sheet on which the first internal electrode 121 is printed and a ceramic green sheet on which the second internal electrode 122 is printed, and then sintering. The material forming the internal electrodes 121 and 122 is not particularly limited, but a material having excellent electrical conductivity may be used.

For example, it may be formed by printing a conductive paste for internal electrodes containing at least one or more of palladium (Pd), nickel (Ni), copper (Cu), and alloys thereof on a ceramic green sheet.

The conductive paste for internal electrodes may be formed by a screen printing method or a gravure printing method, but the present disclosure is not limited thereto.

Meanwhile, in order to implement miniaturization and high capacity of the multilayer ceramic capacitor, thicknesses of the dielectric layer and the internal electrode may need to be reduced such that the number of laminated layers may need to be increased. As the thicknesses of the dielectric layer and the internal electrode become thinner, reliability may deteriorate, and the characteristics such as insulation resistance and breakdown voltage, and the like, may be deteriorated.

Therefore, as the thicknesses of the dielectric layer and the internal electrode are reduced, a reliability improvement effect according to the present disclosure may be increased.

In particular, when thicknesses "te" of the internal electrodes 121 or 122 and a thickness "td" of the dielectric layer 111 are 0.41 μm or less, the reliability and the insulation resistance improvement effect according to the present disclosure may be remarkable.

The thicknesses te of the internal electrodes 121 and 122 may mean an average thickness of the first and second internal electrodes 121 and 122.

The thicknesses te of the internal electrodes 121 and 122 may be measured by scanning an image of the third direction-the first direction cross-section (L-T cross-section) of the body 110 with a scanning electron microscope (SEM).

For example, with regard to arbitrary internal electrodes 121 and 122 extracted from the image obtained by scanning the third direction-the first direction cross-section (W-T cross-section) of the body 110 cut in a central portion in the second direction (L direction) with a scanning electron microscope (SEM), an average value of the internal electrodes 121 and 122 may be measured by measuring the thickness thereof at 30 points having equal intervals in the third direction.

The 30 points having equal intervals may be measured at the capacitance formation portion A, meaning a region in which the internal electrodes 121 and 122 overlap each other.

The thickness td of the dielectric layer 111 may mean an average thickness of the dielectric layer 111 disposed between the first and second internal electrodes 121 and 122.

Similarly to the thickness te of the internal electrodes, the thickness td of the dielectric layer 111 may be measured by scanning an image of the third direction-the first direction cross-section (L-T cross-section) of the body 110 with a scanning electron microscope (SEM).

For example, with regard to arbitrary dielectric layer 111 extracted from an image obtained by scanning the third direction-the first direction cross-section (W-T cross-section) cut at a central portion of the body 110 in the second direction (L direction) with a scanning electron microscope (SEM), an average value of the dielectric layer 111 may be measured by measuring the thickness thereof at 30 points having equal intervals in the third direction.

The 30 points equally spaced may be measured in the capacitance formation portion A, meaning a region in which the internal electrodes 121 and 122 overlap each other.

In addition, thicknesses of cover portions 112 and 113 are not particularly limited. However, in order to more easily implement the miniaturization and high capacity of the multilayer electronic component, the thicknesses "tp" of the cover portions 112 and 113 may be 20 μm or less.

External electrodes 131 and 132 are disposed in the body 110 and connected to the internal electrodes 121 and 122.

As shown in FIG. 2, the external electrodes 131 and 132 may respectively be disposed on the third and fourth surfaces 3 and 4 of the body 110, and include first and second external electrodes 131 and 132 respectively connected to the first and second internal electrodes 121 and 122.

In the present embodiment, a structure in which the multilayer electronic component 100 has two external electrodes 131 and 132 is described. However, the number and shape of the external electrodes 131 and 132 may be changed according to the shape of the internal electrodes 131 and 122 or other purposes.

Meanwhile, the external electrodes 131 and 132 may be formed using any material such as metal, or the like, as long as they have electrical conductivity, and a specific material may be determined in consideration of electrical characteristics, structural stability, and the like, and further may have a structure having multi-layers.

For example, the external electrodes 131 and 132 may include electrode layers 131a and 132a disposed in the body 110 and plating layers 131b and 132b formed on the electrode layers 131a and 132a.

More specifically with respect to the electrode layers 131a and 132a, for example, the electrode layers 131a and 132a may be sintered electrodes including a conductive metal or glass, or a resin-based electrode including a conductive metal and a resin.

In addition, the electrode layers 131a and 132a may be formed in such a manner that a sintered electrode and a resin-based electrode are sequentially formed on the body. In addition, the electrode layers 131a and 132a may be formed by transferring a sheet including a conductive metal onto a body, or may be formed by transferring a sheet including a conductive metal onto a sintering electrode.

A material having excellent electrical conductivity included in the electrode layers 131a and 132a may be used as the conductive metal included in the electrode layers 131a and 132a, and it not particularly limited. For example, the conductive metal may be one or more of nickel (Ni), copper (Cu), and alloys thereof.

More specifically, for example, the plating layers 131b and 132b may be a Ni plating layer or a Sn plating layer, and may be a formed in which the Ni plating layer and the Sn plating layer are sequentially formed, and may be a form in which the Sn plating layer, the Ni plating layer, and the Sn plating layer are sequentially formed. In addition, the plating layers 131b and 132b may include a plurality of Ni plating layers and/or a plurality of Sn plating layers.

A size of the multilayer electronic component 100 does not need to be particularly limited.

However, since the thicknesses of the dielectric layer and the internal electrodes need to be reduced to increase the number of laminated layers, in order to simultaneously implement miniaturization and high capacity, the reliability and insulation resistance improvement effect may be further remarkable in a multilayer electronic component having a size of 1005 (length×width, 1.0 mm×0.5 mm) or less.

Therefore, when a distance between the third and fourth surfaces of the body is defined as L and a distance between the fifth and sixth surfaces is defined as W, the L may be 1.0 mm or less and the W may be 0.5 mm or less. That is, it may be a multilayer electronic component having a size of 1005 (length x width, 1.0 mm×0.5 mm) or less.

EMBODIMENT

In an embodiment of the present disclosure, a dielectric slurry may be prepared by adding additives such as Dy, Nb, Mg, and the like, and an organic solvent such as a binder and ethanol to a barium titanate ($BaTiO_3$) powder, which is a main ingredient, and performing a wet mixing process, and thereafter, a ceramic green sheet may be prepared by coating a surface of a carrier film with the dielectric slurry and drying the coated slurry, whereby a dielectric layer may be formed.

The ceramic green sheet may be formed in a form of a sheet having a thickness of several μms using slurry made from a mixture of ceramic powders, binders, and solvents, and by performing a doctor blade method to the slurry.

Next, an average size of a nickel particle may be within a range of 0.1 to 0.2 μm, and a conductive paste for internal electrodes including a nickel powder of 40 to 50 parts by weight may be provided.

The green sheet may be coated with the conductive paste for internal electrodes through a screen printing process, the green sheets on which an internal electrode pattern is disposed may be laminated, and a laminate may be formed. Then, the laminate may be compressed and cut.

Thereafter, the binder may be removed by heating the cut out laminate, the laminate may be sintered in a high-temperature reducible atmosphere, thereby forming a ceramic body.

In the sintering process, a sintering process may be performed for two hours at 1100 to 1200° C. in a reducible atmosphere (atmosphere of 0.1% $H_2$/99.9% $N_2$, $H_2O/H_2/N_2$), re-oxidation may be performed for three hours in a nitrogen ($N_2$) atmosphere at 1000° C., and a heat treatment may be performed.

Next, a termination process and an electrode sintering process may be performed on the sintered ceramic body using a copper (Cu) paste, and external electrodes may be formed.

In addition, thicknesses of the dielectric layer 111 and the internal electrodes 121 and 122 in the body 110 may be formed such that an average thickness thereof after the sintering process is 0.4 μm or less.

Embodiment 1

First, in order to confirm an influence of a sum of the Dy and Nb contents on the reliability, Test Nos. 1 to 3 were prepared such that the sum of Dy and Nb contents in a dielectric composition, based on 100 mole of the main ingredient ($BaTiO_3$), was 1.5 mole (Test No. 1), 1.8 mole (Test No. 2), and 2.1 mole (Test No. 3).

A Halt accelerated life test (Halt) was performed on Test Nos. 1 to 3, which are prototype MLCC specimens thus completed.

Figure 4A:
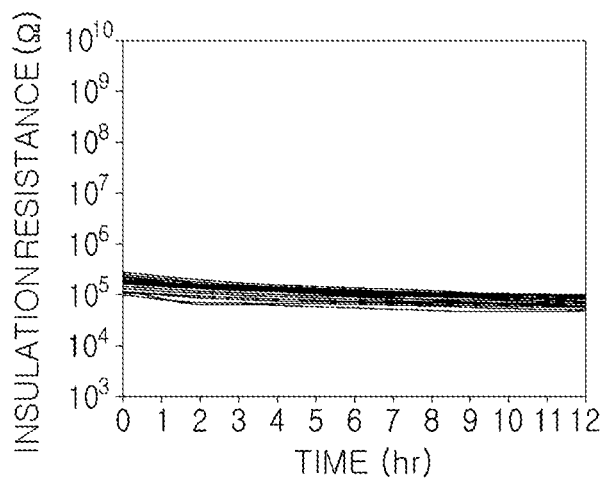
FIGS. 4A, 4B and 4C are graphs of a highly accelerated life test (HALT) for Test Nos. 1 to 3, respectively.
Figure 4B:
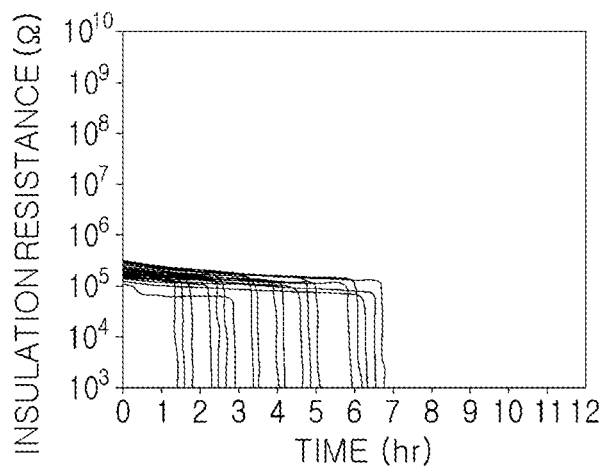
Figure 4C:
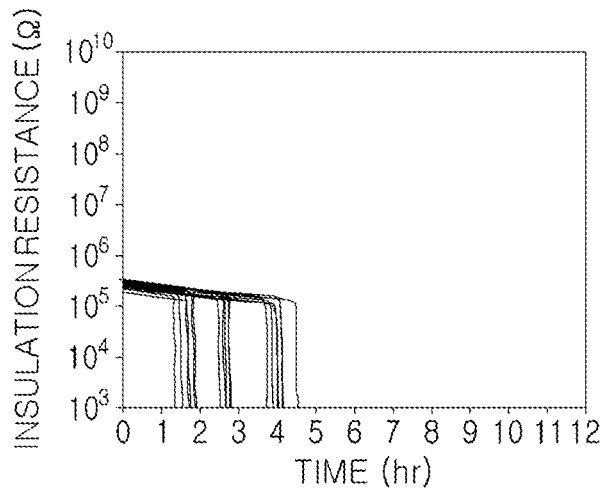

FIGS. 4A to 4C illustrate graphs of the halt accelerated life test (Halt) for Test Nos. 1 to 3. The halt accelerated life test was conducted by measuring a change in insulation resistance by applying 1.5 times a reference voltage at 125° C. for 12 hours.

FIG. 4A illustrates a case of Test No. 1, in which the sum of the Dy and Nb contents was 1.5 mole, based on 100 mole of the main ingredient. In FIG. 4A, it can be confirmed that reliability was excellent because there were no defects in the highly accelerated life test.

In Test No. 1, it can be seen that a nominal capacity was 101%, a breakdown voltage (BDV) was 63V, which is also excellent in reliability evaluation in terms of capacity and BDV.

FIG. 4B illustrates the case of Test No. 2, in which the sum of the Dy and Nb contents was 1.8 mole, based on 100 mole of the main ingredient. FIG. 4C illustrates the case of Test No. 3, in which the sum of the Dy and Nb contents was 2.1 mole, based on 100 mole of the main ingredient.

In the case of Test Nos. 2 and 3, it was confirmed that a large number of failures occurred in the halt accelerated life test (Halt).

In addition, in the case of Test No. 2, it can be seen that a nominal capacity was 90%, a breakdown voltage BDV was 58V, and in the case of Test No. 3, it can be confirmed that a nominal capacity was 82%, a breakdown voltage BDV is 47V, which are all below a standard.

Therefore, it can be confirmed that when the sum of Dy and Nb contents exceeds 1.5 mole, based on 100 mole of the main ingredient, reliability was lowered, and it was difficult for capacity to be ensured, due to the insufficient sintering properties.

Embodiment 2

In order to confirm electrical characteristics according to a change in the Mg content, Test Nos. 4 to 6 were prepared such that Dy, Nb, and Mg, based on 100 mole of the main ingredient had contents shown in the Table 1 below through the above-described preparation process.

The capacity, a dissipation factor (DF), and a breaking down voltage (BDV) were measured for Test Nos. 4 to 6, specimens of a prototype MLCC thus completed and were shown in Table 1 below.

Figure 5A:
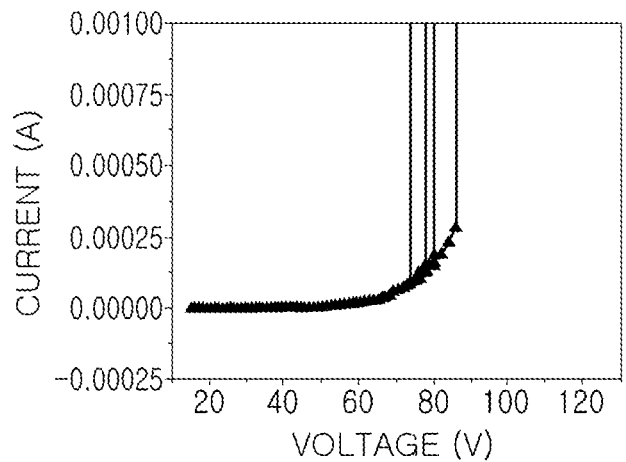
FIGS. 5A, 5B and 5C are I-V curves for Test Nos. 4 to 6, respectively.
Figure 5B:
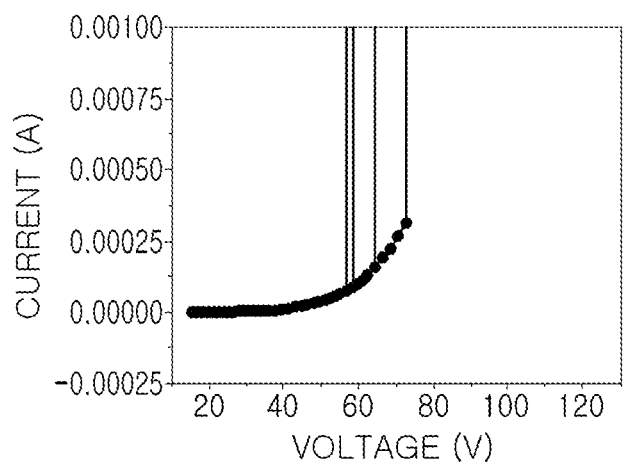
Figure 5C:
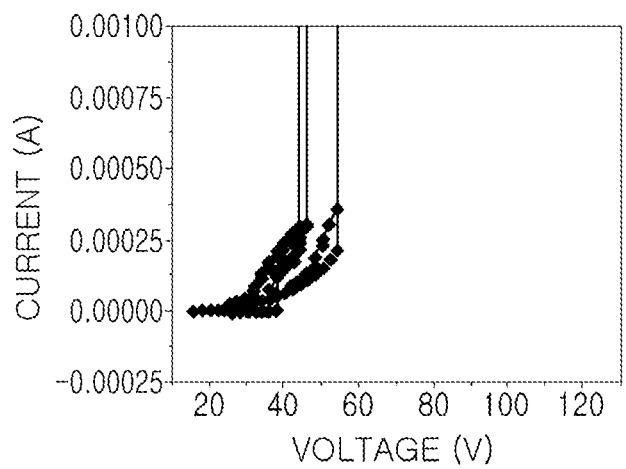

FIG. 5 is an I-V curve for Test Nos. 4 to 6, FIG. 5A is an I-V curve for Test No. 4, FIG. 5B is a I-V curve for Test No. 5, and FIG. 5C is an I-V curve for Test No. 6.

TABLE 1

| Test No. | Dy (mole) | Nb (mole) | Mg (mole) | Capacity (μF) | DF (%) | BDV (V) |
|---|---|---|---|---|---|---|
| 4 | 0.9 | 0.05 | 0.467 | 4.91 | 3.3 | 78 |
| 5 | 0.9 | 0.05 | 0.7 | 5.25 | 3.5 | 72 |
| 6 | 0.9 | 0.05 | 0.93 | 5.17 | 3.5 | 58 |

As can be seen from Tables 1, FIG. 4A, and FIG. 5B, Test Nos. 4 and 5 illustrate a case in which the Mg content satisfied 0.25 mole or more and 0.9 mole or less, based on 100 mole of the main ingredient. It was confirmed that a capacity, a dissipation factor, and BDV characteristics are all excellent. In addition, it can be seen that Test Nos. 4 and 5 had higher BDV values than those of Test Nos. 1 to 3 in which Mg was not added.

However, in the case of Test No. 6, in which Mg was excessively added, as can be shown in Tables 1 and 5C above, it can be seen that BDV was abruptly lowered because the Mg content exceeded 0.9 mole, based on 100 mole of the main ingredient.

As set forth above, according to an embodiment of the present disclosure, as one of various effects of the present disclosure, it is possible to improve reliability of a dielectric composition and a multilayer electronic component including the dielectric composition.

While the exemplary embodiments have been shown and described above, it will be apparent to those skilled in the art that modifications and variations could be made without departing from the scope of the present invention as defined by the appended claims.

What is claimed is:

1. A dielectric composition, comprising:
   a main ingredient having a perovskite structure represented by $ABO_3$, where A is at least one selected from the group consisting of barium, strontium, and calcium and B is at least one selected from the group consisting of titanium, zirconium, and hafnium, and a first accessory ingredient,
   wherein the first accessory ingredient comprises 0.1 mole or more of a rare earth element, 0.02 mole or more of niobium, and 0.25 mole or more of magnesium, based on 100 mole of the main ingredient,
   wherein a sum of contents of the rare earth element and Nb is 1.5 mole or less, based on 100 mole of the main ingredient, and
   wherein the rare earth element is a rare earth element having a smaller ionic radius than that of Dy selected from the group consisting of scandium (Sc), lanthanum (La), actinium (Ac), cerium (Ce), praseodymium (Pr), neodymium (Sm), europium (Eu), gadolinium (Gd), terbium (Tb), holmium (Ho), erbium (Er), thulium (Tm), and ruthenium (Lu).

2. The dielectric composition of claim 1, wherein the first accessory ingredient comprises 0.25 mole or more and 0.7 mole or less of Mg, based on 100 mole of the main ingredient.

3. The dielectric composition of claim 1, wherein the dielectric composition further comprises 0.1 to 2.0 mole of oxides or carbonates including at least one selected from the group consisting of manganese, vanadium, chromium, iron, nickel, cobalt, copper, and zinc, based on 100 mole of the main ingredient, as a second accessory ingredient.

4. The dielectric composition of claim 1, wherein the dielectric composition further comprises 0.001 to 0.5 mole of an oxide including at least one of silicon and aluminum, or a glass compound including Si, based on 100 mole of the main ingredient, as a third accessory ingredient.

5. A multilayer electronic component, comprising:
a body including a dielectric layer and an internal electrode; and
an external electrode disposed on the body and connected to the internal electrode,
wherein the dielectric layer comprises a dielectric composition,
wherein the dielectric composition comprises a main ingredient having a perovskite structure represented by $ABO_3$, where A is at least one of barium, strontium, and calcium and B is at least one of titanium, zirconium, and hafnium, and a first accessory ingredient,
wherein the first accessory ingredient comprises 0.1 mole or more of a rare earth element, 0.02 mole or more of niobium, and 0.25 mole or more of magnesium, and a sum of contents of the rare earth element and Nb is 1.5 mole or less, based on 100 mole of the main ingredient,
wherein the rare earth element is a rare earth element having a smaller ionic radius than that of Dy selected from the group consisting of scandium (Sc), lanthanum (La), actinium (Ac), cerium (Ce), praseodymium (Pr), neodymium (Sm), europium (Eu), gadolinium (Gd), terbium (Tb), holmium (Ho), erbium (Er), thulium (Tm), and ruthenium (Lu), and
wherein the internal electrode has an average thickness of 0.41 μm or less.

6. The multilayer electronic component of claim 5, wherein the first accessory ingredient comprises 0.25 mole or more and 0.7 mole or less of Mg, based on 100 mole of the main ingredient.

7. The multilayer electronic component of claim 5, wherein the dielectric composition further comprises 0.1 to 2.0 mole of oxides or carbonates including at least one selected from the group consisting of manganese, vanadium, chromium, iron, nickel, cobalt, copper and zinc, based on 100 mole of the main ingredient, as a second accessory ingredient.

8. The multilayer electronic component of claim 5, wherein the dielectric composition further comprises 0.001 to 0.5 mole of an oxide including at least one of Si and Al or a glass compound including Si, based on 100 mole of the main ingredient, as a third accessory ingredient.

9. The multilayer electronic component of claim 5, wherein the dielectric layer has an average thickness of 0.41 μm or less.

10. The multilayer electronic component of claim 5, wherein a size of the multilayer electronic component is 1005 (length×width, 1.0 mm×0.5 mm) or less.

11. The multilayer electronic component of claim 5, wherein the dielectric layer comprises a plurality of crystal grains and grain boundaries disposed between adjacent crystal grains, and the Nb is included in the plurality of crystal grains and the grain boundaries.

12. The multilayer electronic component of claim 5, wherein the dielectric layer comprises a plurality of crystal grains and a grain boundary disposed between adjacent crystal grains, and an average grain size of the crystal grains is 200 nm or less.

* * * * *